(12) United States Patent
Ballew (10) Patent No.: US 12,085,121 B1
(45) Date of Patent: Sep. 10, 2024

(54) LATCH IMPROVEMENT FOR OVERHEAD FRAME CORNERS

(71) Applicant: Tony J. Ballew, Livingston, MT (US)

(72) Inventor: Tony J. Ballew, Livingston, MT (US)

( * ) Notice: Subject to any disclaimer, the term of this patent is extended or adjusted under 35 U.S.C. 154(b) by 0 days.

(21) Appl. No.: 18/209,449

(22) Filed: Jun. 13, 2023

(51) Int. Cl.
  *F16B 7/22* (2006.01)
  *F16B 45/04* (2006.01)
  *G02B 7/00* (2021.01)

(52) U.S. Cl.
  CPC .............. *F16B 7/22* (2013.01); *F16B 45/053* (2021.05); *F16B 45/049* (2021.05); *G02B 7/00* (2013.01)

(58) Field of Classification Search
  CPC .......... F16B 7/22; F16B 45/053; F16B 45/02; F16B 45/022; F16B 45/033; F16B 45/034; F16B 45/036; G07B 7/00; A47G 1/10; B61G 3/24
  See application file for complete search history.

(56) References Cited

U.S. PATENT DOCUMENTS

| | | | | |
|---|---|---|---|---|
| 316,269 A | * | 4/1885 | Jewett .................... | F16B 45/015 59/93 |
| 501,320 A | * | 7/1893 | Brosnan ................ | F16B 45/012 24/601.3 |
| 531,442 A | * | 12/1894 | Mason et al. ......... | F16B 45/012 24/601.3 |
| 4,437,212 A | * | 3/1984 | Stahl ................... | A44B 13/0023 24/698.2 |
| 4,519,151 A | * | 5/1985 | Johnson ................ | B44D 3/185 160/374.1 |
| 5,493,800 A | * | 2/1996 | Chinitz ................... | B41F 15/36 160/381 |
| 5,621,994 A | * | 4/1997 | Cobb ................... | G09F 15/0012 40/739 |
| 10,768,519 B1 | * | 9/2020 | Ballew ................... | G03B 21/64 |

* cited by examiner

*Primary Examiner* — Robert Sandy
*Assistant Examiner* — Rowland Do (57) ABSTRACT

Improved latches for overhead corners which reduce the susceptibility of bundled frame components becoming unlatched and separated due to insufficient torque of latch knobs or to repeated shock. The improved latches retain the prior art notched latches along with their strength and simplicity, but are capable of absorbing shock by accommodating a rotational dynamic present in a latch-to-strike connection rather than attempting to prevent it. One of two styles of moveable, pressure-actuated latch keepers is joined to a notched latch of an overhead frame. One style of keeper provides a barrier into the latch's notch, while another style of keeper provides a barrier relative to the strike's features. The latch keepers provide a predetermined amount of resistance to a radial force applied to the latch. This force retains the strike into the latch's notch in a fully-seated orientation, yet allows for the beneficial shock-absorbing rotational movement of the latch to the strike. This use of pressure-actuated keepers eliminates the need for the prior art latch knob and thus also eliminates the subjectivity associated with determining the proper degree of torque required to sufficiently secure the latch to the strike under a range of conditions.

1 Claim, 10 Drawing Sheets

LATCH IMPROVEMENT FOR OVERHEAD FRAME CORNERS

CROSS-REFERENCE TO RELATED APPLICATIONS

This application claims the benefit of provisional patent application Ser. No. 63/651,518 filed Jun. 13 2022 by the present inventor. This application also uses components of my overhead corners disclosed in U.S. Pat. No. 10,768,519 granted Sep. 8, 2020.

FEDERALLY SPONSORED RESEARCH

N/A

SEQUENCE LISTING OR PROGRAM

N/A

BACKGROUND OF THE INVENTION—FIELD OF INVENTION

This invention generally relates to motion picture and still photography equipment, and specifically to overhead frames for lighting control.

BACKGROUND OF THE INVENTION—PRIOR ART—FIGS. 1, 2, 3, 4

Figure 1:
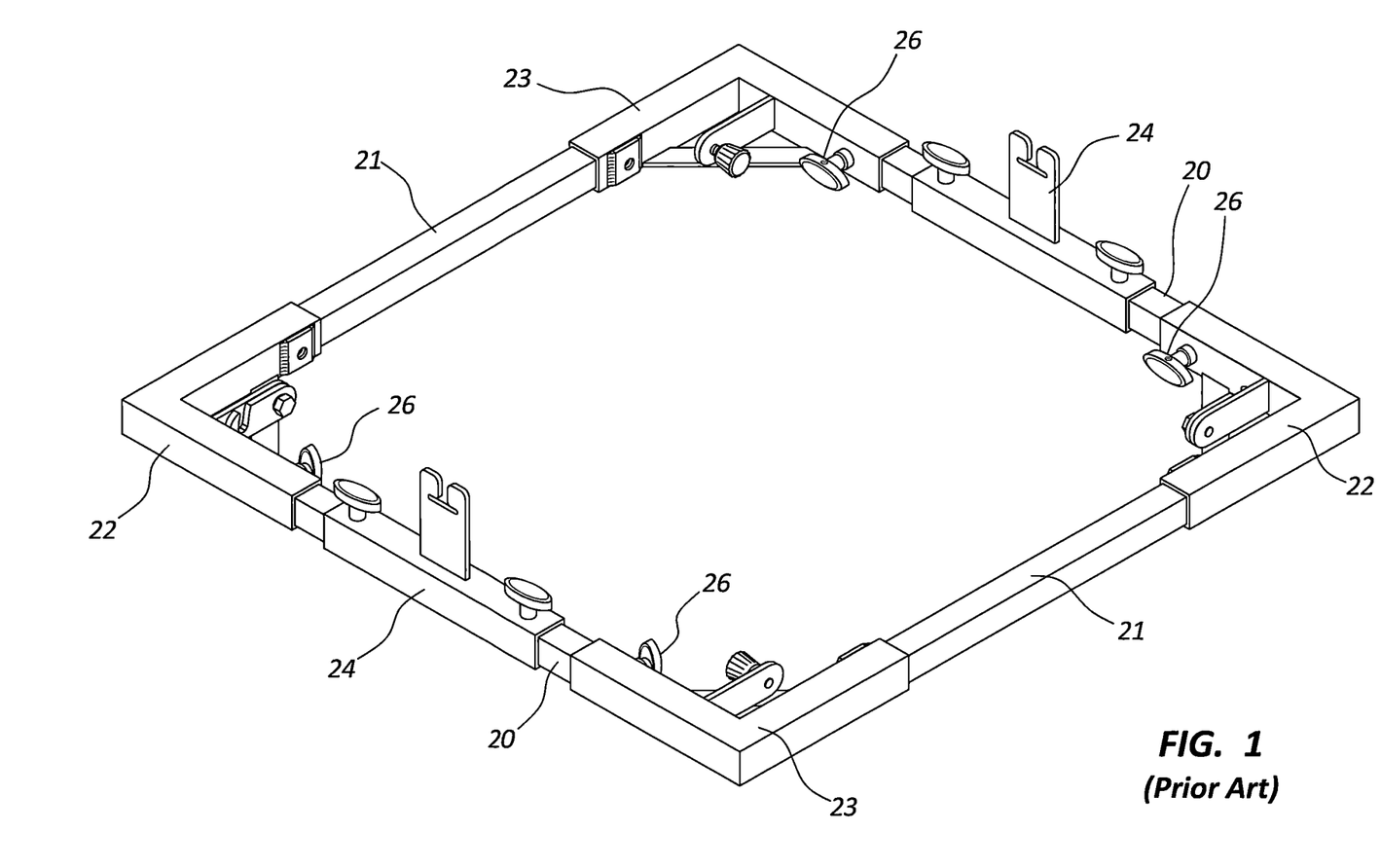

Overhead frames have been used in the motion picture and still photography industry for decades. Various materials are stretched and tied into an overhead frame to diffuse, reduce, cut, or bounce light. FIG. 1 shows a typical frame comprising two swing sides 20 and two main sides 21, usually made of alloy or aluminum; four corners 22/23 made of a tubular material being formed to receive and hold sides 20 and 21 in a square or rectangular shape on a single plane; and a plurality of mounting ears 24 with which to attach the frame to stands for its support. Primary fasteners, including socket head set screws and T-handle tensioning bolts 26 are used in the ears and corners for securing them to the sides. By loosening T-handle bolts 26, the swing sides 20 may be separated from the corners so that the frame may be bundled, as in FIG. 2, to facilitate transporting or storing the frame.

Due to the simplicity of overhead frames, there have been a limited number of improvements by which to rigidly secure frame components into a compact bundle for ease of storage and reassembly. One of my own inventions, Ballew (2020) U.S. Pat. No. 10,768,519 claims secondary fastener components (shown in FIGS. 3, 4) that provide for minimal disassembly of overhead frame component sections; that rigidly secure the minimally disassembled frame components into a compact bundle; that eliminate set screw and tensioning bolt protrusions of prior art frames that complicate stowage and retrieval of disassembled frames; and that require approximately one-half of the space required for storage of bundled frame components over that required by its prior art.

Figure 3:
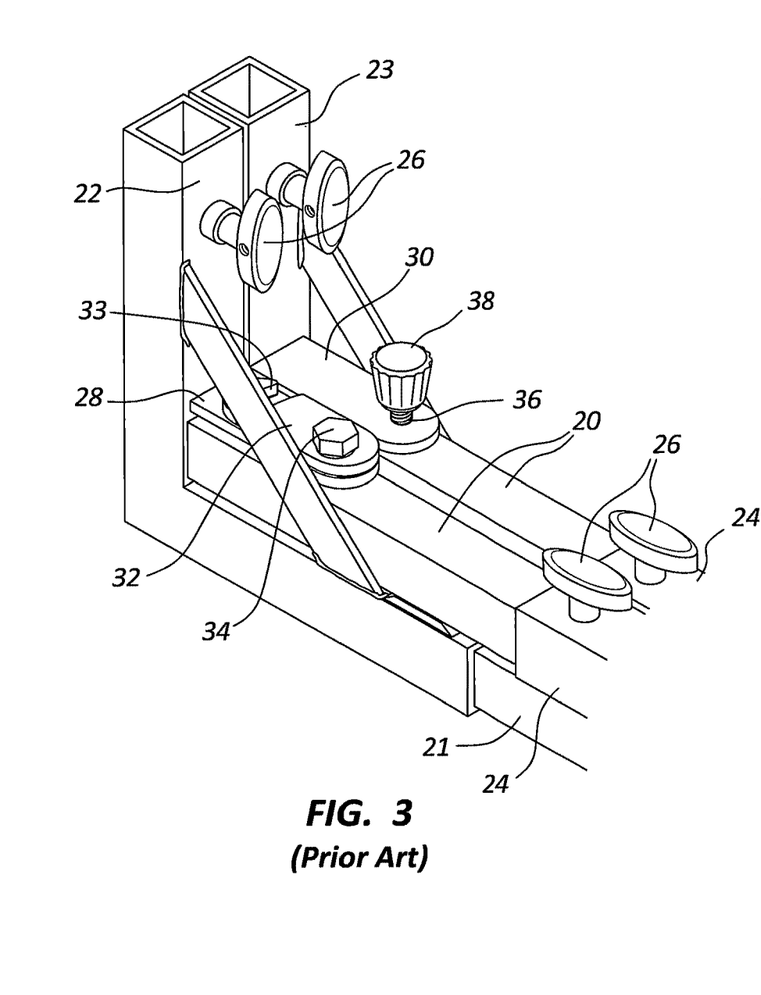
Figure 4:
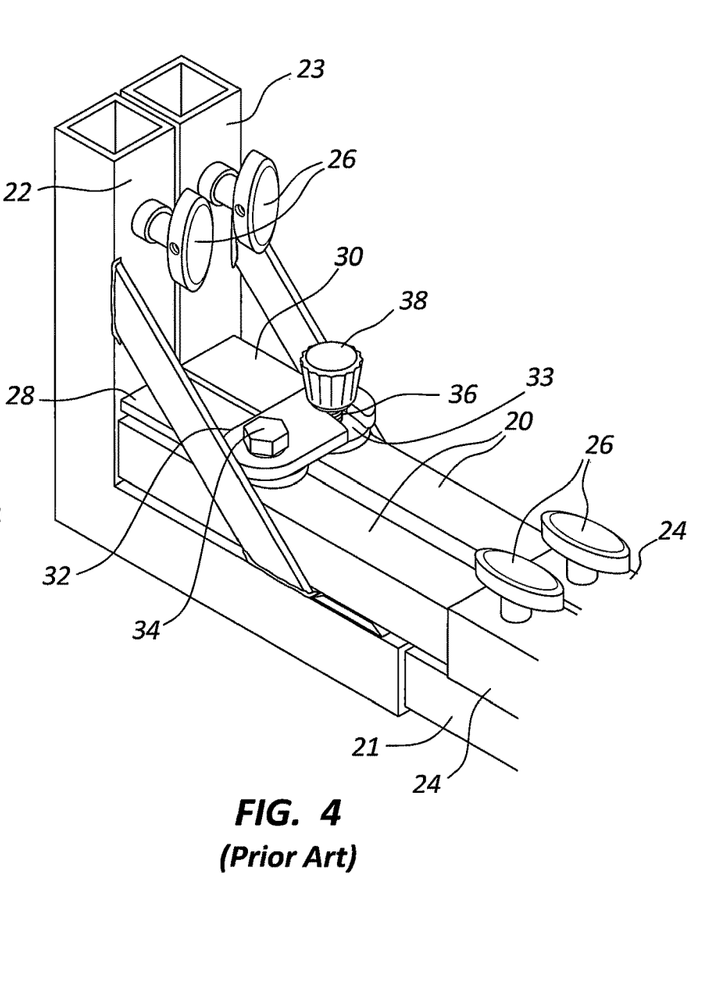

The secondary fasteners of Ballew are made up of latch components and retainers. The latch components include a notched latch 32, a latch bolt 34, a strike stud 36, and a latch knob 38. The retainers include a latch retainer 28 and a strike retainer 30. Retainers 28 and 30 include a flat, rigid portion of material substantially equal in width to the width of the corner's tubular material. Retainer 28 and 30 are joined to a "vertically referenced" portion of each corner so that the flat portion is parallel to a "horizontally referenced" portion of each corner and in such an orientation that a swing side 20 may be placed between each retainer's lower surface and the upper surface of the horizontally referenced portion of the corners 22/23, as shown.

Latch 32, made of a flat rigid material, is joined to the upper surface of latch retainer 28 by a latch shoulder bolt 34 passing through a bore in latch 32 and threaded into a threaded bore in retainer 28. Strike stud 36 and latch knob 38 are joined to the upper surface of strike retainer 30 by stud 36 being threaded into a threaded bore in retainer 30.

Figure 2:
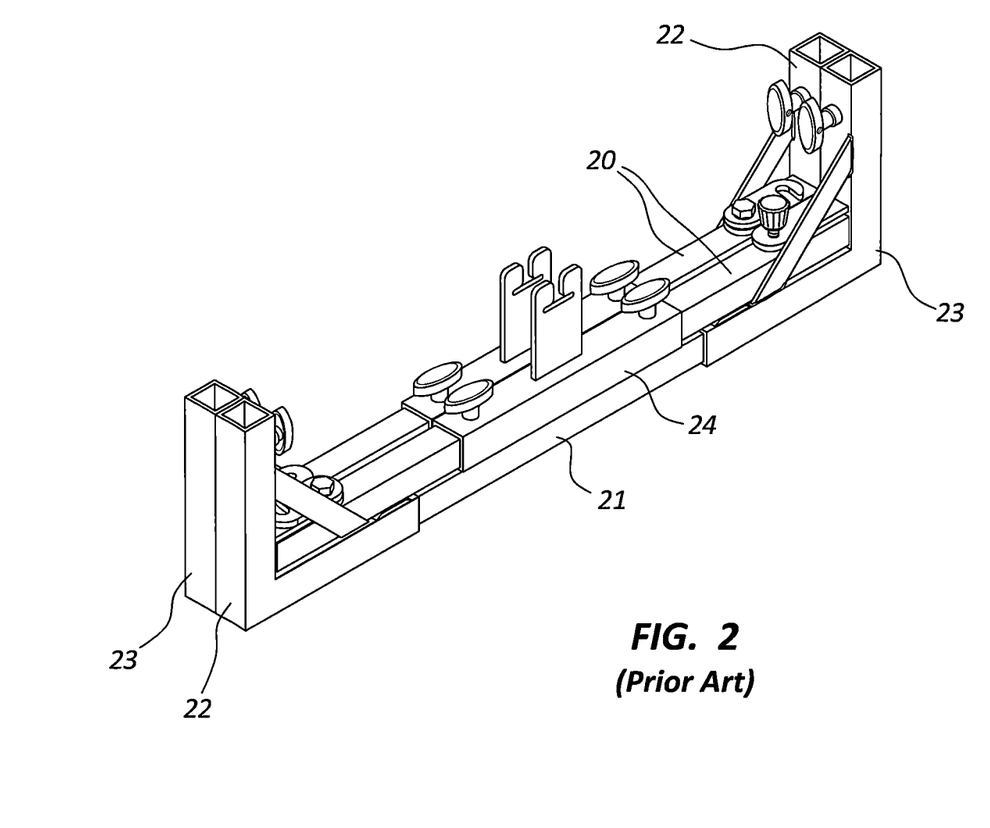

FIGS. 2, 3, and 4 shows the bundling process of Ballew as comprising swing sides 20 first being placed into a bundled configuration on top of main sides 21 beneath retainers 28 and 30. To complete the bundling process, FIG. 4 shows latch 32 rotated into a position so that a notch 33 formed into latch 32 fully engages with strike stud 36. Latch knob 38 is then tightened down onto latch 32.

Although Ballew is effective at its stated objects and advantages, retention into its bundled configuration is dependent upon adequate tension of the latch knob 38 in order to retain notched latch 32 against strike stud 36, as shown in FIG. 4. If knob 38 of a bundled frame is insufficiently tightened by an end user, it's possible in some situations, such as continuous vibration during a lengthy transit, for latch 32 to separate from strike 36, thus defeating the purpose of the latch assembly. In addition, when frame components are in a bundled orientation, a minute degree of lateral shift between adjacent corners is possible and creates a potential for slight fore-and-aft rotation of the notched latch around the strike. This scenario also presents a situation in which, if a latch knob is insufficiently tightened and subjected to shock, the latch is again capable of separating from its strike.

BACKGROUND OF THE INVENTION—OBJECTS AND ADVANTAGES

Accordingly, several objects and advantages of the present invention are to provide a latch and strike assembly that offers greater resistance to inadvertent unlatching of a bundled overhead frame due to multiple factors. My latch improvements eliminate dependence upon the subjectivity of an end-user's judgment regarding proper latch knob torque by transferring the means for accomplishing the latch-to-strike connection from "strike-centered" retaining components to "latch-centered" retaining components. This translates to a strike that is no longer constructed to hold the latch to itself but rather that a latch is constructed to hold itself to the strike and to do so without a requirement of a specific torque.

The present latch improvements are also designed to accommodate the fore-and-aft rotational potential between adjacent bundled corners rather than attempting to prevent it. These improvements not only accommodate the rotational dynamic but also utilize this allowable rotation as a means for absorbing shock.

The advantages of the present invention are that knob 28 and its associated torque requirements are eliminated; that a potential for insufficient torque of latch/strike components and subsequent separation of a bundled frame is precluded; that a system of latch and strike components offering a reduced effort to acquire a positive "latched" or "unlatched" position is provided; and that a visual means for validating a latched or unlatched state is presented. Additional advantages are that the latch components are more resistant to shock, and that the elapsed time required to secure an improved latch onto its respective strike is even more reduced over that of the prior art. Still further objects and advantages will become apparent from a consideration of the drawings and ensuing description.

SUMMARY

Improved latch and strike components for overhead frame corners eliminate specific elements requiring subjectivity regarding adequate torque in order to maintain a latch's contact with a strike. The improved latches of the present invention retain the simplicity, strength, and benefits of a prior art notched latch but eliminate the strike's latch knob 28 as a means to maintain a latch's position onto strike 36. Accordingly, the present invention offers a latch keeper integral to a notched latch that maintains the latch-to-strike connection of bundled overhead frame components even when exposed to shock, vibration, or lateral shift between the frame components. Two types of latch keepers are presented. One type of keeper provides a movable, pressure-actuated barrier into the latch's notch, while another style of keeper provides a movable, pressure-activated barrier relative to the features of the strike.

DRAWINGS—FIGURES

FIG. 1—Fully assembled frame with prior art corners
FIG. 2—Minimally disassembled frame in bundled configuration
FIG. 3—Detail of prior art corners; unlatched
FIG. 4—Prior art corners in latched position
FIG. 5A—Preferred latch keeper; fully seated on strike
FIG. 5B—Preferred latch keeper; disengaging from strike
FIG. 6—Notched latch—top view
FIG. 7—Latch and keeper; exploded view
FIG. 8—Preferred Latch and Keeper; mounted
FIG. 9—Alternate preferred embodiment
FIG. 10A—Alternative latch
FIG. 10B—Alternative latch; exploded
FIG. 10C—Alternative latch; closed
FIG. 10D—Alternative Latch; open
FIG. 11—Alternative latch; mounted
FIG. 12A—2nd alternative latch with over-strike keeper
FIG. 12B—2nd alternative latch; side view

DRAWING—REFERENCE NUMERALS

20—Swing Sides
21—Main Sides
22—Latch Corner
23—Strike Corner
24—Mounting Ears
26—T-Handle Tension Bolts
28—Latch Retainer
30—Strike Retainer
32—Notched Latch
33—Latch Notch
34—Latch Shoulder Bolt
35—Latch Bolt Bore
36—Strike
38—Latch Knob
40—Latch Keeper
42—Keeper Tab
43—Tab Void
44—Boss
46—Preferred Latch
48—Boss Bore, countersunk
49—Boss Screw
50—Strike
54—Alternate Keeper
56—Latch Shell
58—Latch Bolt Bushing
60—Alternative Latch
62—Pin Bore
64—Lever Slot
66—Latch Pin
67—Thumb Lever
68—Lever Bore
70—Spring
72—Pin Retainer Screw
80—2nd Alternative Latch Keeper
81—Keeper Fastener
82—Keeper Tab

DETAILED DECRYPTION—PREFERRED EMBODIMENT—FIGS. 5A-8

Figure 5A:
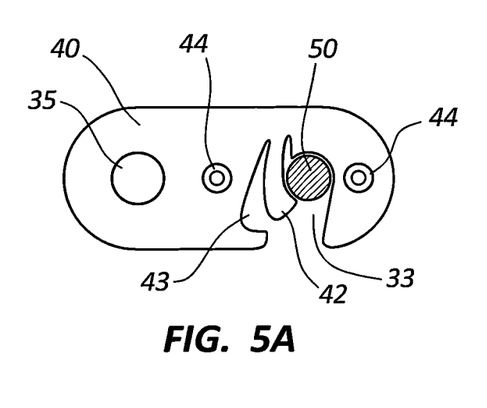

FIG. 5A shows a latch keeper 40 formed of a material of acceptable elasticity which, when joined to a latch 46, provides a movable, pressure-activated barrier into a latch's notch 33. The outer perimeter of keeper 40 and the rightmost half of the keeper's notch 33 perimeter match those of notched latch 46 of FIG. 6. A latch bolt bore 35 of keeper 40 is identical in size and relative orientation to the latch bolt bore 35 of latch 46. Positioning bosses 44 are located on the upper surface of keeper 40, as shown, and are sized and oriented to fit precisely into boss bores 48 of latch 46 when keeper 40 and latch 46 are joined as indicated in FIG. 7. Each of the bosses 44 include a bore of predetermined size through their central longitudinal axis to accommodate boss screws 49, as also in FIG. 7.

Figure 5B:
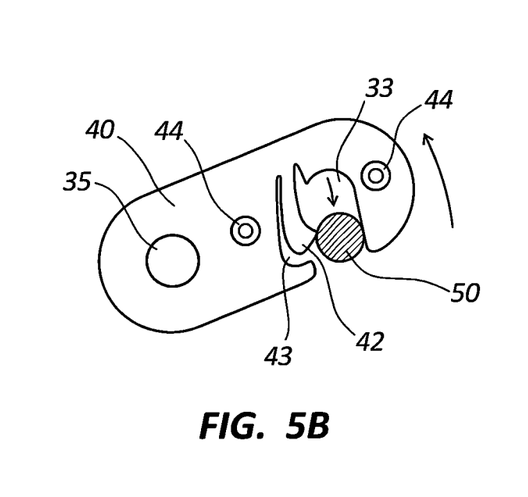

In FIG. 5A, a cross section of a strike bolt 50 is shown as fully seated into notch 33. A keeper tab 42 is formed as part of keeper 40 as shown. Tab 42 provides the pressure-activated barrier into notch 33 as previously noted. Keeper and tab 40/42 are constructed of a material capable of resisting a predetermined amount of radial force so that when strike 50 is fully seated into notch 33, a resistance to force by tab 42 against strike 50 is capable of holding strike 50 into notch 33 until a greater force to disengage the latch is applied. Tab 42 is constructed in such a shape so that when keeper 40 is fully seated onto strike 50, tab 42 protrudes into notch 33 a predetermined distance and rests at a predetermined distance from strike 50. A tab void 43 is also shown. Void 43 is sized so that it is capable of fully receiving tab 42 when tab 42 is flexed aside as it passes by strike 50 during latching or unlatching, as indicated in FIG. 5B.

Figure 6:
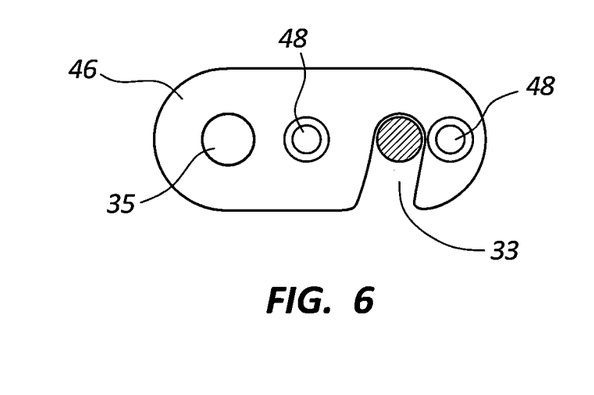
Figure 7:
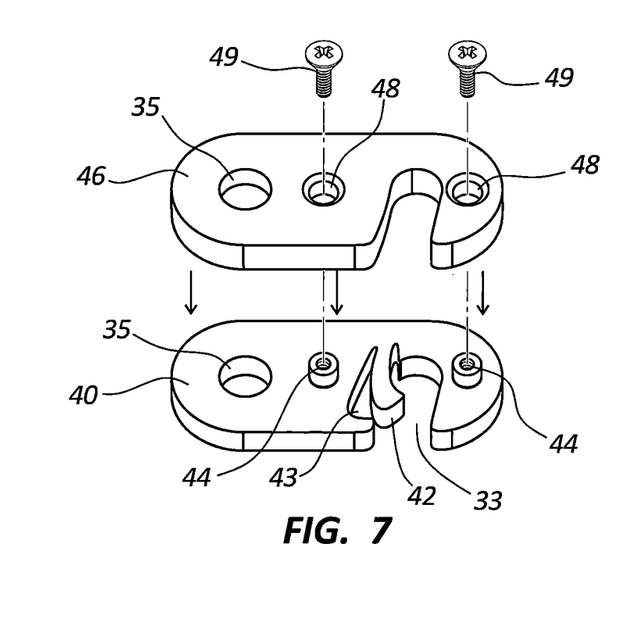
Figure 8:
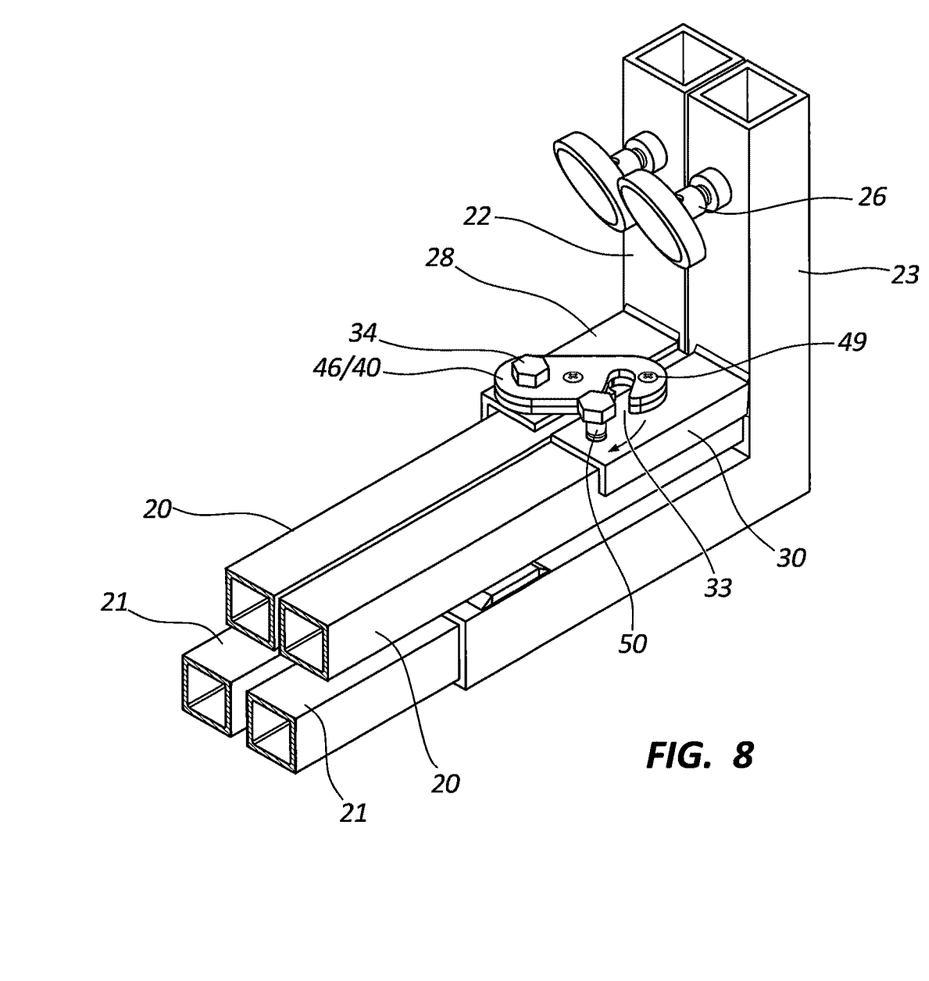

FIG. 6 shows the preferred notched latch 46. As noted, bores 48 communicate with bosses 44 of keeper 40 when latch 46 and keeper 40 are mated to one another as indicated in FIG. 7. Bores 48 are countersunk to receive countersunk boss screws 49 so that the tops of screws 49 are flush with or below the upper surface of latch 46 when screws 49 are driven into bosses 44. The latch bolt bore 35 is sized to accommodate a latch shoulder bolt 34, as shown in FIG. 8, so that latch 46/40 is capable of rotational movement around the shoulder of bolt 34 when bolt 34 is joined to latch retainer 28. Notch 33 is sized to receive strike 50 and is located at a predetermined distance from bore 35 so that when the components of a minimally disassembled frame are bundled together, latch 46/40 is capable of rotating into a position in which strike 50 is fully seated into notch 33. In FIG. 8, due to the absence of latch knob 38, a shoulder bolt 50 is chosen as a strike to prevent latch 46/40 from vertical disengagement, or "lifting off of" strike 50 when strike 50 is radially engaged and fully seated.

Operation—Preferred Embodiment—FIGS. 2, 8

Components of a minimally disassembled overhead frame are bundled together as shown in FIG. 2. Latch and keeper 46/40 are rotated, as in FIG. 8, onto strike 50 until strike 50 is fully seated into notch 33 and behind keeper tab 43 (not seen). To release latch 46/40, the latch is pushed away from strike 50 until it is clear of the strike.

Figure 9:
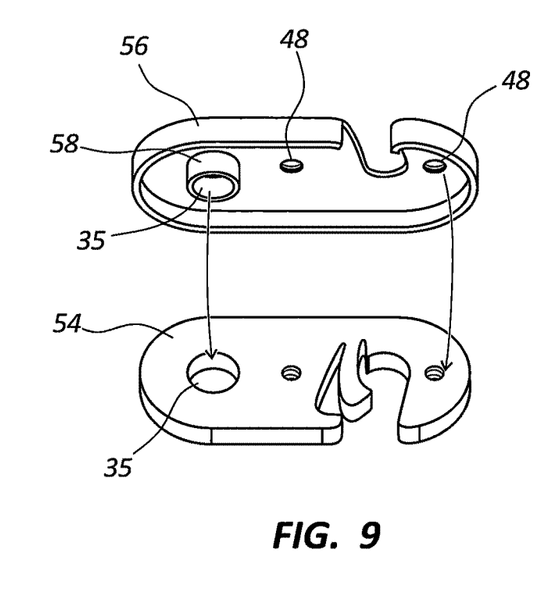

Alternate Preferred Embodiment—Description and Operation—FIGS. 9, 8

FIG. 9 shows an alternate latch/keeper embodiment in which a keeper 54 is partially encapsulated within a latch shell 56. Latch shell 56 is of identical outer dimensions as latch 46 and retains the same latch bolt bore diameter 35 and position, and the same notch size 33 and position. Shell 56 is milled, cast, or otherwise formed with an outer perimeter as shown and is of a predetermined material having a composition so that keeper 54 is protected from and subsequently capable of withstanding a predetermined amount of force without undue distortion or breakage. Keeper 54 incorporates all elements of keeper 40 with the exceptions of having a smaller outer perimeter sized to fit into shell 56; a larger latch bolt bore 35 to receive a latch bolt bushing 58 that is joined to, cast or milled into shell 56; and elimination of bosses 44. Shell 56 and keeper 54 are secured to one another with countersunk latch screws (not shown) or other fasteners through bores 48 in the shell. Latch 56/54 and strike (not shown) are joined to retainers 28 and 30 in the same manner as the preferred embodiment. Operation is identical to that of the preferred embodiment in FIG. 8.

2nd Alternative Embodiment—Description—FIGS. 10A-10D

Figure 10A:
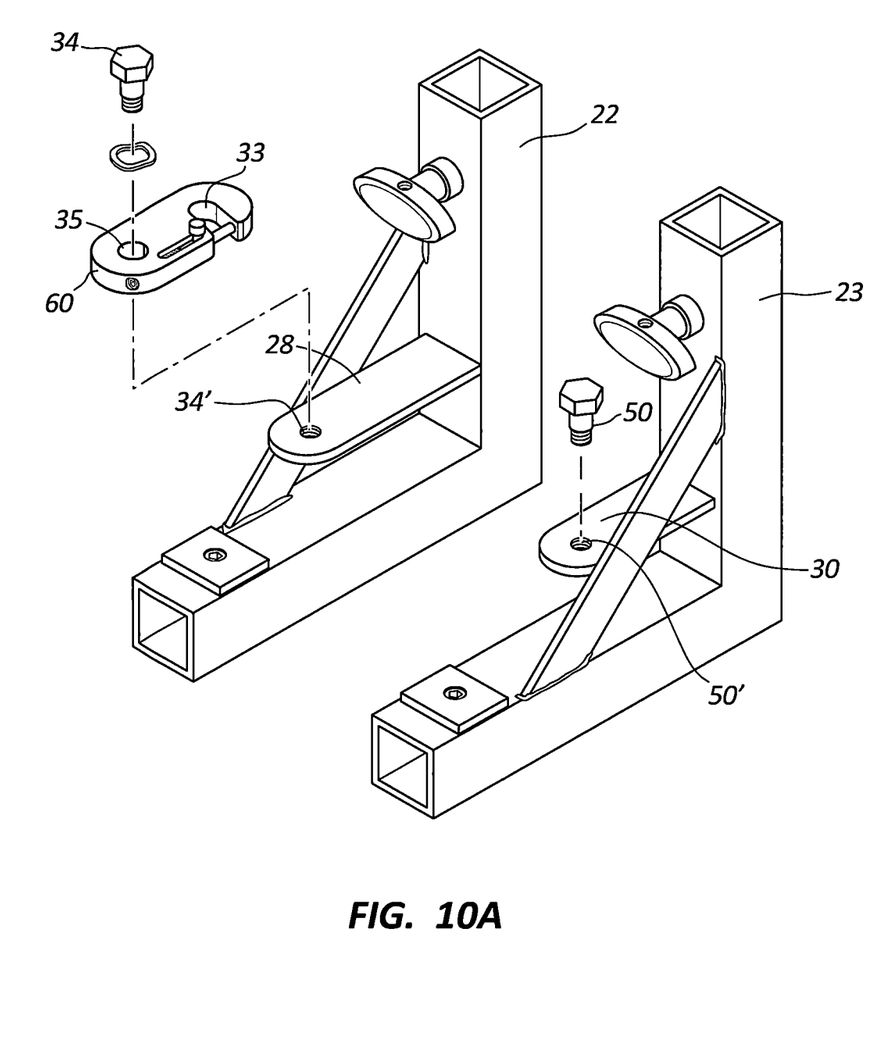

FIG. 10A shows an exploded view of an alternative latch 60 and strike bolt 50 in position to be fastened to overhead corners. Latch 60 is joined to latch retainer 28 by shoulder bolt 34. Bore 35 in latch 60 is of a size that when bolt 34 inserted into bore 35 and threaded into retainer bore 34', latch 60 is capable of pivoting around bolt 34. A notch 33 is formed into latch 60 and is of such a size and is of such a distance from bore 35 that notch 33 is capable of pivoting onto and engaging with strike shoulder bolt 50 when the overhead frame components are bundled together as in FIG. 2.

Figure 10B:
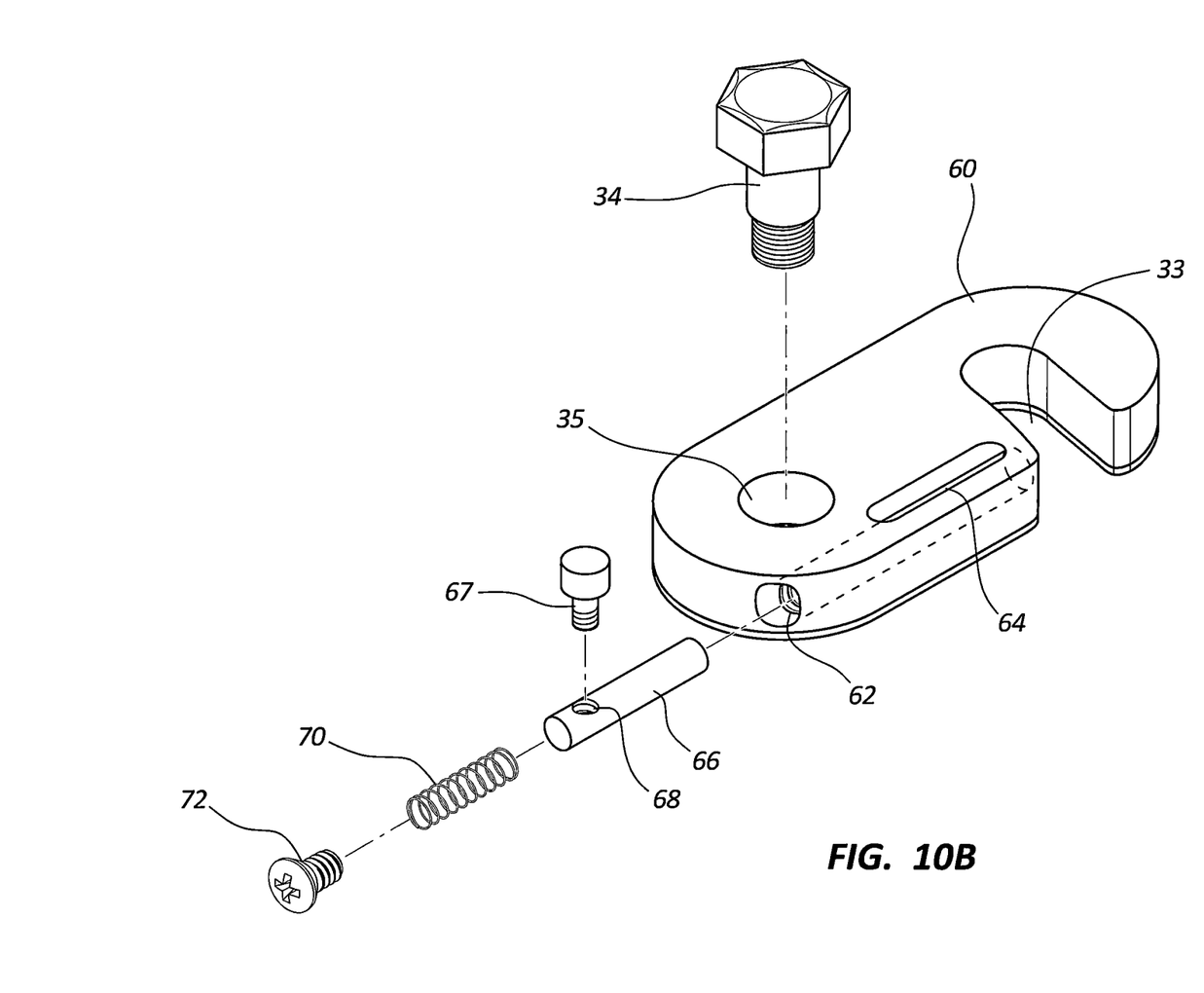

In FIG. 10B, the alternative latch 60 is shown in an exploded view. A latch 60 is formed with notch 33 and bore 35 as described above. A horizontal pin bore 62 is formed as shown. A lever slot 64 is formed above bore 62 and extends down into bore 62. Latch pin 66, sized to fit bore 62, is inserted into bore 62. Thumb lever 67, having a threaded lower end, is placed through 64 and is mated with threaded bore 68 of pin 66. Spring 70, also sized to fit bore 62, is then placed into bore 62. Pin retainer screw 72 is threaded into a threaded portion of bore 62 to retain spring 70 and pin 72.

Figure 10C:
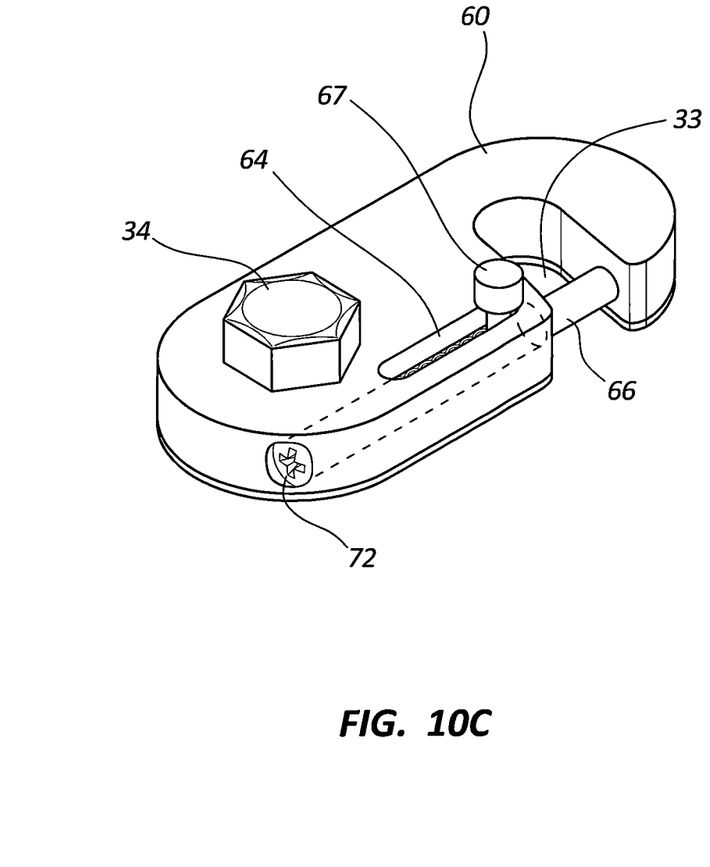
Figure 10D:
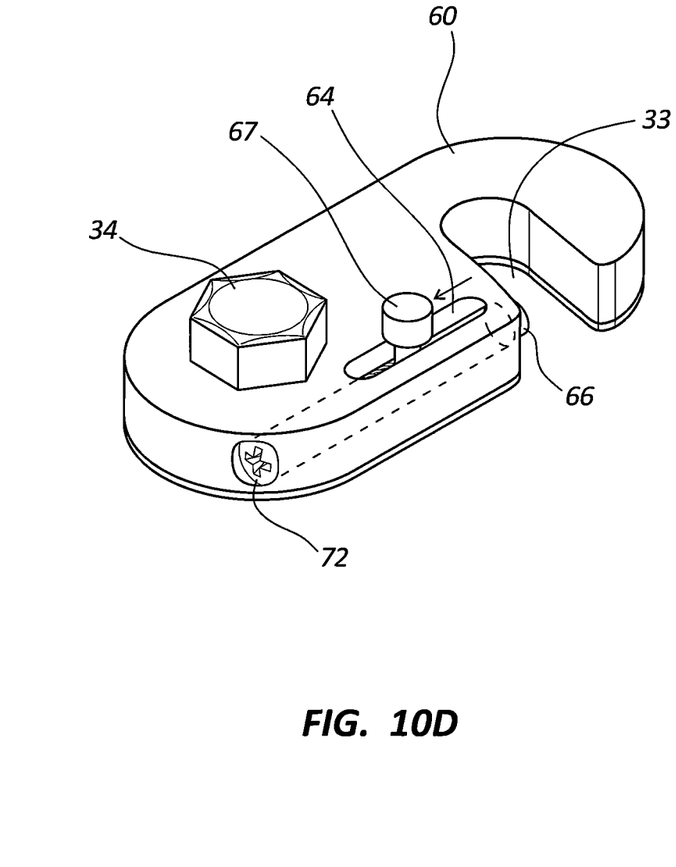
Figure 11:
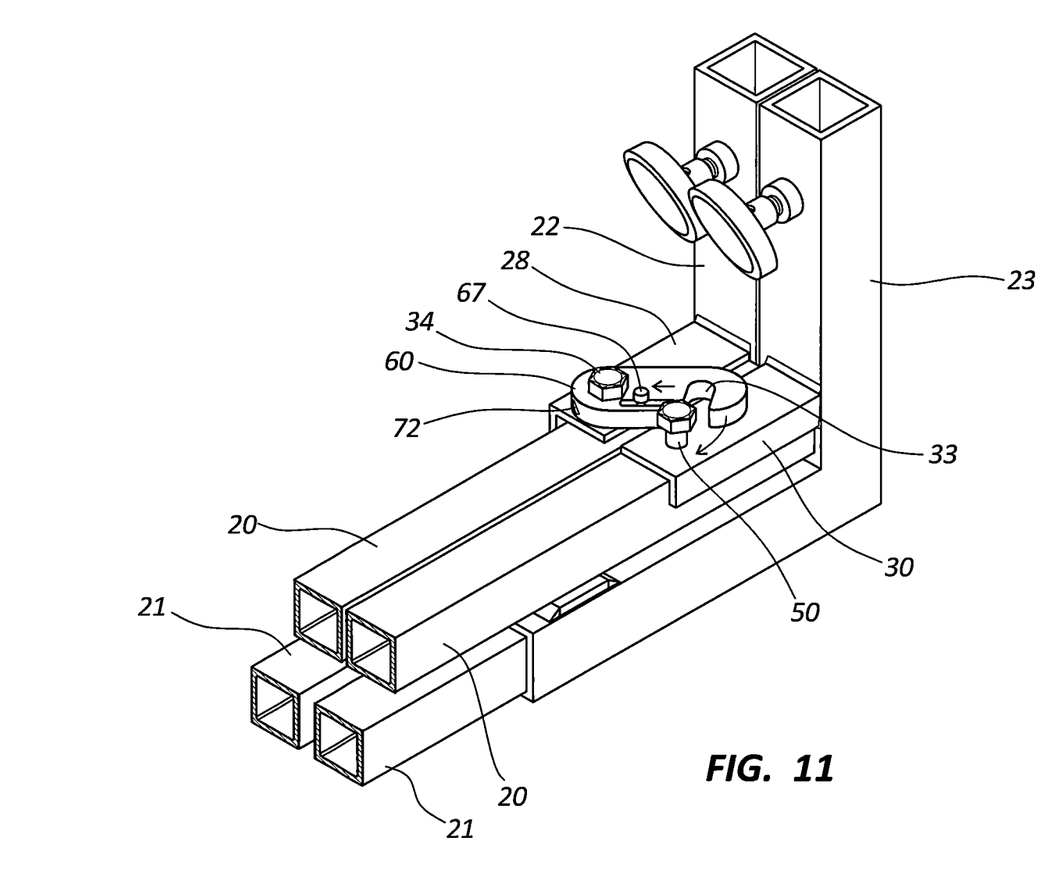

2nd Alternative Embodiment—Operation—FIGS. 10C, 10D, 11

With latch 60 in closed position as in FIG. 10C, thumb lever 67 is retracted away from notch 33, as in FIG. 10D, until pin 66 is fully retracted. With pin 66 fully retracted, latch 60 is pivoted, as in FIG. 11, onto strike bolt 50 until notch 33 is fully engaged with strike 50. Thumb lever 67 is then released, and holds latch 60 captive onto strike 50.

Figure 12A:
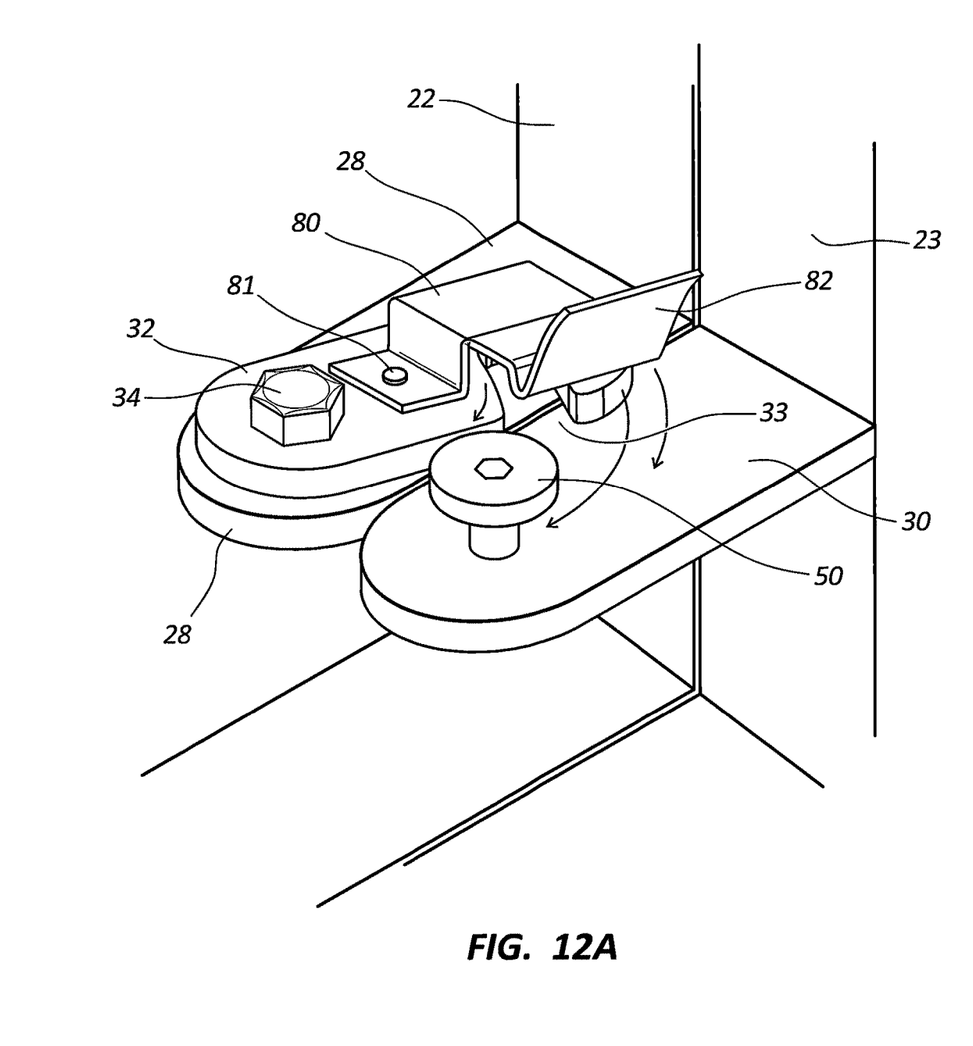
Figure 12B:
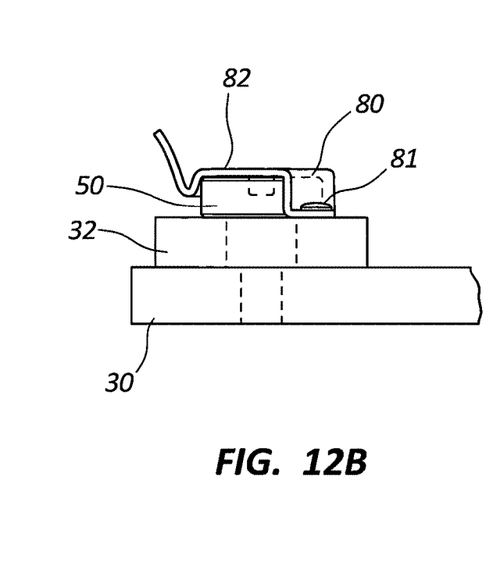

3rd Alternative Embodiment—Description—FIGS. 12A, 12B

In FIG. 12A, an alternative embodiment latch keeper is illustrated showing a latch keeper embodiment 80 mounted to a notched latch 32 by fasteners 81 and centered over notch 33. Keeper 80 is constructed of a predetermined material capable of resisting a predetermined amount of radial force so that when strike 50 is fully seated into notch 33, a resistance to force by tab 82 against strike 50 is capable of holding strike 50 into notch 33 until a greater force to disengage the latch is applied. In FIG. 12B, Keeper tab 82 is shown as extending out from keeper 80 and over a leading edge of strike 50. Keeper 50 and tab 82 are of a predetermined size and shape to fully receive strike 50 into notch 33, and to retain strike 50 into notch 33 of latch 32.

3rd Alternative Embodiment—Operation—FIGS. 2, 12A, 12B

Components of a minimally disassembled overhead frame are bundled together as shown in FIG. 2. Latch and keeper 80/32 are rotated, as indicated in FIG. 12A, onto strike 50 until strike 50 is fully seated into notch 33 and behind keeper tab 82. To release latch 80/32, the latch is pushed away from strike 50 until it is clear of the strike.

Ramifications—

Thus the reader will see that the improved latch of the present invention reduces the possibility for a bundled overhead frame to become unlatched from shock or vibration due to insufficient torque of a prior art latch knob, and that the improved latch reduces the elapsed time for securing bundled frame components. While my above description contains many specificities, these should not be construed as limitations on the scope of the invention, but rather as an exemplification of one preferred embodiment thereof. Many other variations are possible.

For example, In FIG. 8, a shoulder bolt 50 is chosen as a strike to prevent vertical disengagement, or "lifting off of" latch 46/40 from strike 50 when strike 50 is radially engaged and fully seated. Other means of preventing vertical disengagement are possible, such as a bore through a strike and a pricket joined to a latch capable of communicating with the strike bore.

The specification describes a notched latch being retrofitted with a latch keeper. This is due to current material availability regarding both adequate strength of a latch and required elasticity of the latch keeper. It is conceivable that a single material would adequately perform both duties, and thus provide a savings of time to manufacture and a reduction in the types and quantities of materials required for manufacture.

The 2nd alternative embodiment illustrates a latch pin of specific shape. The given shape requires manual retraction of the pin in order to properly fasten to the strike bolt. It is possible that a latch pin having a beveled end (similar to the latch bolt on a door knob) would be capable of retraction by way of simple force of the latch pin against the strike without a need for pin retraction via the thumb lever. Such an improvement would enhance and speed the fastening process.

The invention claimed is:

1. An improved latch for the corner structures of overhead frames, said corner structures being of the type comprising a length of tubular material formed into a right angle, said right angle comprising a vertical leg and a horizontal leg, the ends of said tubular material forming sockets oriented at 90 degrees to one another, each of said sockets capable of receiving a side of an overhead frame, said corner structures also comprising secondary fastener components affixed to said corner structures, said secondary fastener components comprising a latch retainer, a strike retainer, and a latch assembly, (a) said latch retainer comprising a first section of flat, rigid material having an upper face and a lower face, said latch retainer having a predetermined length and a width substantially equal to or less than the outside diameter of said tubular material of said latch corner and comprising a first threaded bore therethrough at a predetermined location, said latch retainer permanently affixed to said vertical leg of said latch corner in an orientation that is parallel to said horizontal leg of said latch corner, said lower face oriented toward said horizontal leg and at such a distance away from said horizontal leg that a swing side may be placed between said lower face and the upper surface of said horizontal leg, (b) said strike retainer comprising a second section of flat, rigid material having an upper face and a lower face, said strike retainer having a predetermined length and a width substantially equal to or less than the outside diameter of said tubular material of said strike corner and comprising a second threaded bore therethrough at a predetermined location, said strike retainer permanently affixed to said vertical leg of said strike corner in an orientation that is parallel to said horizontal leg of said strike corner, said lower face oriented toward said horizontal leg and at such a distance away from said horizontal leg that a swing side may be placed between said lower face and the upper surface of said horizontal leg, (c) said latch assembly comprising (1) a notched latch, said latch constructed of a third rigid material of predetermined size and shape and comprising a bolt bore therethrough near one end of said latch and an elongated notch therethrough of a predetermined size and shape near the other end of said latch, said latch being moveably fastened to said latch retainer by (2) a latch bolt, said latch bolt passing through said bolt bore of said latch and being joined to said latch retainer so that said latch is capable of being moved radially around a central axis of said latch bolt, the improvement of the present invention comprising (a) a strike, said strike comprising a predetermined size and shape relative to said size, shape and orientation of said latch so that a vertical disengagement of said latch from said strike is precluded; said strike being joined to said strike retainer and further being of a size and orientation so that said elongated notch of said latch is capable of radially engaging and radially disengaging from said strike when said corners are together positioned in a bundled orientation; said improvement further comprising (b) a latch keeper, said latch keeper being joined to said latch and comprising a moveable, pressure-actuated barrier constructed of a material capable of resisting a predetermined amount of radial force against said latch keeper, said latch keeper being located in a predetermined orientation relative to said strike when said strike is fully seated into said notch of said latch so that when said strike is fully seated into said notch of said latch, the resistance to said predetermined amount of radial force by said keeper against said strike is capable of holding said latch into contact with said strike, and so that said latch keeper is capable of allowing disengagement between said latch and said strike when a force greater than the resistance to said predetermined amount of radial force by said keeper is radially applied to said latch, whereby said bundled orientation of said overhead frames is maintained without the necessity of a latch knob and a related, subjective requirement of latch knob torque by an end user, thereby precluding an inadvertent separation of said frame components.

\* \* \* \* \*

UNITED STATES PATENT AND TRADEMARK OFFICE
CERTIFICATE OF CORRECTION

| | | |
|---|---|---|
| PATENT NO. | : 12,085,121 B1 | Page 1 of 1 |
| APPLICATION NO. | : 18/209449 | |
| DATED | : September 10, 2024 | |
| INVENTOR(S) | : Tony J. Ballew | |

It is certified that error appears in the above-identified patent and that said Letters Patent is hereby corrected as shown below:

In the Specification

Column 4, Lines 18-19, should read:
DETAILED DESCRIPTION—PREFERRED EMBODIMENT—FIGS. 5A-8

Signed and Sealed this
Fifth Day of November, 2024

Katherine Kelly Vidal
*Director of the United States Patent and Trademark Office*